| United States Patent [19] | | [11] | 4,130,513 |
|---|---|---|---|
| Reale et al. | | [45] | Dec. 19, 1978 |

[54] FLAME RETARDED POLYURETHANE FOAMS WITH IMPROVED COLOR QUALITIES

[75] Inventors: Michael J. Reale, Brewster, N.Y.; Barry Jacobs, Bethel, Conn.

[73] Assignee: Stauffer Chemical Company, Westport, Conn.

[21] Appl. No.: 808,753

[22] Filed: Jun. 22, 1977

[51] Int. Cl.² ............................ C08K 5/18; C08K 5/34; C08K 5/51
[52] U.S. Cl. .............................. 521/107; 260/45.7 P; 260/45.8 N; 260/45.9 QB; 521/163; 521/906
[58] Field of Search .................. 260/45.9 QB, 2.5 AJ, 260/2.5 BB, 45.8 N

[56] References Cited

U.S. PATENT DOCUMENTS

| 3,574,149 | 4/1971 | Harrington | 260/45.75 W |
|---|---|---|---|
| 3,637,542 | 1/1972 | Doerge et al. | 260/2.5 AJ |
| 3,637,573 | 1/1972 | Mise et al. | 260/45.9 QB |
| 3,798,184 | 3/1974 | Cuscurida et al. | 260/45.9 QB |
| 4,005,034 | 1/1977 | Weil | 260/2.5 AJ |

*Primary Examiner*—Donald E. Czaja
*Assistant Examiner*—R. A. White
*Attorney, Agent, or Firm*—William R. Robinson

[57] ABSTRACT

The color qualities of low density polyurethane foams produced with certain flame retardants is improved by reducing scorch through incorporation of a mixture of diphenyl p-phenylenediamine and the reaction product of diphenylamine and acetone into the foam. The mixture can be employed by admixing with the flame retardant from about 0.5 to about 5.0 percent of said mixture by weight of the flame retardant. The weight ratio of diphenyl p-phenylenediamine to the reaction product of diphenylamine and acetone is from about 1:20 to about 20:1.

10 Claims, No Drawings

FLAME RETARDED POLYURETHANE FOAMS WITH IMPROVED COLOR QUALITIES

BACKGROUND OF THE INVENTION

1. Field of the Invention

The present invention generally relates to flame retarded polyurethane foams, and particularly concerns flame retarded, low density polyurethane foams having improved color characteristics.

2. The Prior Art

When low density polyurethane foams are treated with flame retardants to reduce their flammability, certain physical properties of the foams are detrimentally affected. One of the frequent problems is scorching of the center of the foam buns which results in unacceptable color of the foam. This discoloration is reduced to an acceptable level pursuant to the present invention by incorporating a mixture of diphenyl p-phenylenediamine and the reaction product of diphenylamine and acetone into the foam.

It is known in the prior art to utilize the individual components of the mixture of the present invention to prevent degradation of polyurethane foams caused by heat, weathering and other environmental factors. In U.S. Pat. No. 3,637,573, stabilized foams containing p-phenylenediamine and similar compounds are described. These foams have improved resistance to outdoor weathering. U.S. Pat. No. 3,798,184 discloses stabilized foams containing the reaction product of acetone and diphenylamine. These foams also have improved resistance to outdoor weathering. Neither of the foregoing patents, however, disclose the mixture of diphenyl p-phenylenediamine and the reaction product of acetone and diphenylamine as a scorch reducing composition.

Various compositions that are normally present in polyurethane foam formulations can catalyze free radical reactions that cause scorching. Among such compositions are tertiary amines which can be present in the formulation as catalysts for the reaction of isocyanate with water or with polyol, or as amine-started polyols or both, and various metallic compounds that can be present as impurities. These problems are described in U.S. Pat. No. 3,214,397. It is a theory of the present invention that these free radical reactions are prevented by the mixture herein described. The mixture of the present invention acts as a free radical inhibitor, thereby preventing the unacceptable scorching of the foam.

SUMMARY OF THE INVENTION

In accordance with the present invention, the color of low density urethane foams treated with flame retardants is improved by the addition of a mixture of diphenyl p-phenylenediamine and the reaction product of diphenylamine and acetone to the foam.

Many flame retardants cause color problems in low density urethane foams. The discoloration occurs when the foam becomes scorched during cure. This scorching is believed to be caused by free radical reactions among the various components of the foam formulation. By providing the foregoing mixture in accordance with the present invention these scorch problems are overcome.

DETAILED DESCRIPTION OF THE INVENTION

The present invention is particularly concerned with low density polyurethane foams that become unacceptably scorched when cured in the presence of a flame retardant.

The present invention is also particularly concerned with poly (haloethyl-ethyleneoxy) phosphoric acid esters used as flame retardants in low density polyurethane foams. Such flame retardants are described, for example, in U.S. Pat. No. 3,896,187.

Flame retardant compositions comprised of mixtures of poly (haloethyl-ethyleneoxy) phosphoric acid esters and other flame retardants are also included in the scope of the present invention. Said other flame retardants include tris(haloalkyl) phosphates such as tris(dibromopropyl) phosphate, tris($\beta$-chloroethyl) phosphate and tris($\beta$-chloropropyl) phosphate among others.

The flame retardants are employed in a flame retardant effective amount, generally from about 3 percent to about 20 percent by weight of the polyol in the foam formulation.

The mixture of diphenyl p-phenylenediamine and the reaction product of diphenylamine and acetone utilized in accordance with the present invention can be admixed with the foam formulation by conventional techniques. For example, it can be added alone or in combination with other ingredients of the foam formulation. It can also be admixed with the flame retardant composition prior to admixture of the flame retardant with the foam formulation.

The mixture of diphenyl p-phenylenediamine and the reaction product of diphenylamine and acetone employed in the foams of the present invention is generally provided in amounts from about 0.5 percent to about 5.0 percent by weight of the flame retardant composition. The weight ratio of diphenyl p-phenylenediamine to the reaction product of diphenylamine and acetone is generally from about 1:20 to about 20:1. A flame retardant composition incorporating the mixture therein can be conveniently prepared prior to incorporation into the foam formulation.

Numerous conventional foam formulations for low density polyurethane foams can be utilized in accordance with the present invention. The selection of ingredients and process conditions can easily be determined by those skilled in the art.

The color of the foams of the present invention can be evaluated by numerous recognized methods as set forth, for example, in *Principles of Color Technology*, Fred W. Billinger, Jr. and Max Saltzman (Wiley Interscience, 1966).

In the experimental work on the present invention, a Hunter colorimeter was utilized to measure color differences pursuant to the color-difference formula:

$$\Delta E \text{ (Hunter)} = (\Delta L^2 + \Delta a^2 + \Delta b^2)^{\frac{1}{2}}$$

Where:

$\Delta$ E (Hunter) = color difference $\Delta$ L = lightness compared to standard $\Delta$ a = redness, if positive, or greenness, if negative, compared to a standard $\Delta$ b = Yellowness, if positive, of blueness, if negative, compared to a standard All of the values for $\Delta$L, $\Delta$a and $\Delta$b are calculated within the Hunter instrument by electrical means and read directly from its dials. The most commonly used standard of color comparison is a pure white sample. A white tile was used in the experimental work on the present invention.

The present invention will be more fully illustrated in the Examples which follow.

EXAMPLES

All of the foam formulations utilized in the experimental work on the present invention had the following basic components.

| | |
|---|---|
| 3500 Molecular weight polyether polyol | 100 grams |
| 80/20 Toluene diisocyanate (110 Index) | 61.1 grams |
| Water | 5.0 grams |
| Non-hydrolyzable silicone surfactant | 1.1 gram |
| Diazabicyclo octane catalyst (33% active) | 0.3 gram |
| N-Ethylmorpholine catalyst | 0.05 gram |
| 50% Stannous octoate | 0.4 gram |

In addition to the foregoing components, various amounts of flame retardant and other materials were added to the mixture prior to curing. This is illustrated in Tables I and II below.

After mixing all of the foam ingredients, the materials for each foam were poured into a 12 × 12 × 5 inch cake box. When the foam buns completed their rises, thermocouples were inserted into the centers of the buns. When the thermocouples recorded 150° C., they were removed from the buns. The buns were then placed into a preheated microwave oven that had been calibrated so that 350 grams of water would increase in temperature by 50° C. when heated for 4 minutes. The buns were cured in the oven for four minutes, and then removed and allowed to cure at room temperature for an additional 30 minutes.

Following the cure of the buns, a one inch thick slice was cut perpendicular to the rise from the center of each bun. A 2 inch square sample was then removed from the center of each slice. A Hunter colormeter was then used to measure the values for calculating color difference.

The following tables summarize this experimental work.

TABLE I

| Foam | Components added to basic foam formulation | ΔE (Hunter)** color difference |
|---|---|---|
| 1. | 8 grams FR[1] | 49.21 |
| 2. | 8 grams FR[1] + 0.65%[2]A[3] + 0.35% B[4] | 4.23 |
| 3. | 8 grams FR[1] + 0.33% A[3] + 0.18% B[4] | 10.48 |
| 4. | 8 grams FR[1] + 0.16% A[3] + 0.09% B[4] | 24.05 |
| 5. | 8 grams FR[1] + 0.35% B[4] | 14.82 |
| 6. | 8 grams FR[1] + 1.0% B[4] | 11.36 |
| 7. | 8 grams FR[1] + 0.65% A[3] | 19.99 |
| 8. | 8 grams FR[1] + 1.0% A[3] | 24.36 |

[1]2:1 blend of poly(chloroethyl-ethyleneoxy) phosphoric acid ester : tris(dichloropropyl) phosphate
[2]All percentages are by weight of the flame retardant
[3]Diphenylamine-acetone reaction product (Uniroyal's NAUGATUCK AMINOX)
[4]Diphenyl p-phenylenediamine (Uniroyal's JZF)
**The standard value was a piece of white tile having a ΔE (Hunter) value of zero.

The color difference values in the foregoing table illustrates the substantial color improvement brought about by addition of the mixture of the present invention to the flame retarded foam formulations.

The following table illustrates the effects of various ratios of the diphenylamine-acetone reaction product to diphenyl p-phenylene diamine and the effects of various levels of that mixture on the color difference. Eight grams of the flame retarded utilized according to Table I was used in each case.

TABLE II

| Percentage of Mixture in Flame Retardant | Ratio of A to B (See Table I) | ΔE (Hunter Color Difference) |
|---|---|---|
| 0 | 0 | 20.69 |
| 5 | 13/7 | 5.02 |
| 2 | 13/7 | 1.94 |
| 0.5 | 1/9 | 1.44 |
| 1.0 | 1/9 | 1.59 |
| 5.0 | 1/9 | 6.42 |
| 0.5 | 7/13 | 0.79 |
| 1.0 | 7/13 | 2.60 |
| 5.0 | 7/13 | 6.25 |
| 0.5 | 1/1 | 1.05 |
| 1.0 | 1/1 | 1.77 |
| 5.0 | 1/1 | 6.32 |
| 0.5 | 9/1 | 1.51 |
| 1.0 | 9/1 | 2.17 |
| 5.0 | 9/1 | 4.13 |

A white tile standard was used in this case as in Table I.

The foregoing Table II illustrates an upper limit of about 5% for the percentage of the mixture in the flame retardant. At that level, it was found that the foam began to pick up color from the additive itself. However, the scorch at that level was completely eliminated from the foam samples.

Having set forth the general nature and some examples of the present invention, the scope is now particularly set forth in the appended claims.

What is claimed is:

1. A flame retardant polyurethane foam comprising a low density polyurethane foam, a flame retardant amount of a flame retardant comprised of a poly(haloethyl-ethyleneoxy) phosphoric acid ester and from about 0.5 percent to about 5.0 percent by weight of said flame retardant of a mixture of diphenyl p-phenylene diamine and the reaction product of diphenylamine and acetone wherein the components of said mixture are in a weight ratio from about 1:20 to about 20:1.

2. The flame retardant polyurethane foam of claim 1 wherein the flame retardant is further comprised of a tris (haloalkyl) phosphate.

3. The flame retardant polyurethane foam of claim 2 wherein the weight ratio of poly (haloethyl-ethyleneoxy) phosphoric acid ester to tris (haloalkyl) phosphate is about 2 to 1.

4. The flame retardant polyurethane foam of claim 2 wherein the amount of flame retardant is from about 3 percent to about 20 percent by weight of polyol present in the foam formulation.

5. The flame retardant polyurethane foam of claim 2 wherein the poly(haloethyl-ethyleneoxy) phosphoric acid ester is poly(chloroethyl-ethyleneoxy) phosphoric acid ester and the tris (haloalkyl) phosphate is tris (dichloropropyl) phosphate.

6. A composition for flame retarding low density polyurethane foam comprising a poly (haloethyl-ethyleneoxy) phosphoric acid ester and from about 0.5 percent to about 5.0 percent by weight of a mixture of diphenyl p-phenylenediamine and the reaction product of diphenylamine and acetone wherein the components of said mixture are in a weight ratio from about 1:20 to about 20:1.

7. The composition of claim 6 further comprising a tris (haloalkyl) phosphate.

8. The composition of claim 7 wherein the weight ratio of poly (haloethyl-ethyleneoxy) phosphoric acid ester to tris (haloalkyl) phosphate is about 2 to 1.

9. The composition of claim 7 wherein the poly (haloethyl-ethyleneoxy) phosphoric acid ester is poly (chloroethyl-ethyleneoxy) phosphoric acid ester and the tris (haloalkyl) phosphate is tris (dichloropropyl) phosphate.

10. A method of preparing a flame retardant, low density polyurethane foam comprising admixing with a foam formulation a flame retardant comprised of a poly (haloethyl-ethyleneoxy) phosphoric acid ester and a tris (haloalkyl) phosphate and further admixing from about 0.5 percent to about 5.0 percent by weight of said flame retardant of a mixture of diphenyl p-phenylenediamine and the reaction product of diphenylamine and acetone wherein the components of said mixtures are in a weight ratio from about 1:20 to about 20:1 followed by curing.

* * * * *